Oct. 4, 1960 C. E. LOMAX 2,955,160

TELEPHONE SYSTEM

Filed Jan. 27, 1956 10 Sheets-Sheet 1

INVENTOR.
CLARENCE E. LOMAX

BY [signature]

ATTY.

Oct. 4, 1960 C. E. LOMAX 2,955,160

TELEPHONE SYSTEM

Filed Jan. 27, 1956 10 Sheets-Sheet 2

PAYSTATION 200

INVENTOR.

CLARENCE E. LOMAX

BY Wm Walter Owen

ATTY.

SELECTOR 300

INVENTOR.
CLARENCE E. LOMAX
BY Wm. Walter Owen.
ATTY.

CONNECTOR 400

INVENTOR.
CLARENCE E. LOMAX
BY Wm. Walter Owen
ATTY.

INVENTOR.
CLARENCE E. LOMAX
BY Wm. Walter Owen
ATTY.

Oct. 4, 1960 C. E. LOMAX 2,955,160

TELEPHONE SYSTEM

Filed Jan. 27, 1956 10 Sheets-Sheet 6

INVENTOR.
CLARENCE E. LOMAX
BY [signature]
ATTY.

Oct. 4, 1960 C. E. LOMAX 2,955,160

TELEPHONE SYSTEM

Filed Jan. 27, 1956 10 Sheets-Sheet 7

*INVENTOR.*

CLARENCE E. LOMAX

*BY* Wm. Watts Owen.

ATTY.

Oct. 4, 1960 C. E. LOMAX 2,955,160

TELEPHONE SYSTEM

Filed Jan. 27, 1956 10 Sheets-Sheet 8

INVENTOR.

CLARENCE E. LOMAX

BY Wm. Walter Owen.

ATTY.

Oct. 4, 1960 C. E. LOMAX 2,955,160

TELEPHONE SYSTEM

Filed Jan. 27, 1956 10 Sheets-Sheet 9

PAYSTATION 900

INVENTOR.

CLARENCE E. LOMAX

BY Mc Walter Owen

ATTY.

Oct. 4, 1960 C. E. LOMAX 2,955,160

TELEPHONE SYSTEM

Filed Jan. 27, 1956 10 Sheets-Sheet 10

LINE CIRCUIT 1000

INVENTOR.
CLARENCE E. LOMAX
BY Mc Walter Owen
ATTY.

United States Patent Office 2,955,160

Patented Oct. 4, 1960

2,955,160

TELEPHONE SYSTEM

Clarence E. Lomax, Chicago, Ill., assignor to Automatic Electric Laboratories, Inc., a corporation of Delaware Filed Jan. 27, 1956, Ser. No. 561,867

5 Claims. (Cl. 179—6.3)

The present invention relates to a telephone system in general and more particularly relates to a telephone system having prepay postpay paystations connected to a party line with lockout and to single station lines respectively, and also having other types of stations connected to respective single station lines and/or a party line and utilizing equipment which is accessible to all stations in the system.

Specifically the present arrangement illustrates a system wherein all of the above types of stations utilize the same type of connector switch for completing a call to any other station in the system; the same type of combined line and recording (hereinafter referred to as CLR) trunk for completing a call to an operator and the same type of reverting call switch for the purpose of establishing a call between two stations on a party line or for testing the ringer of the one station on a single station line respectively.

Figure 1:
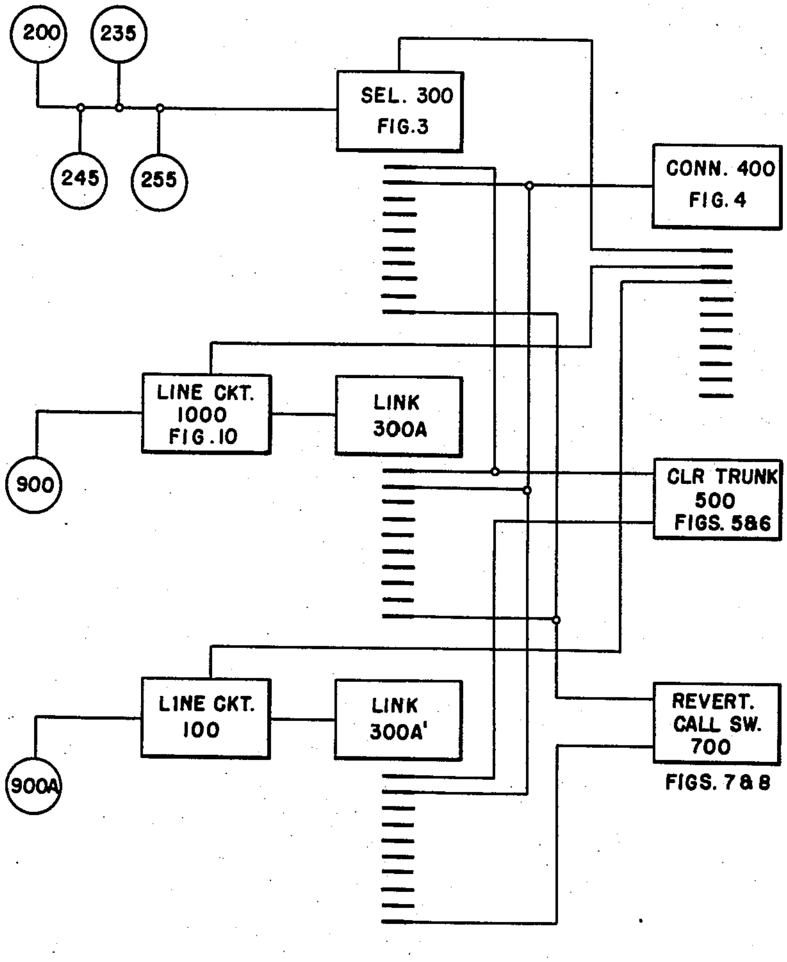

Fig. 1 illustrates the trunking arrangement utilized in the present disclosure.

Figure 2:
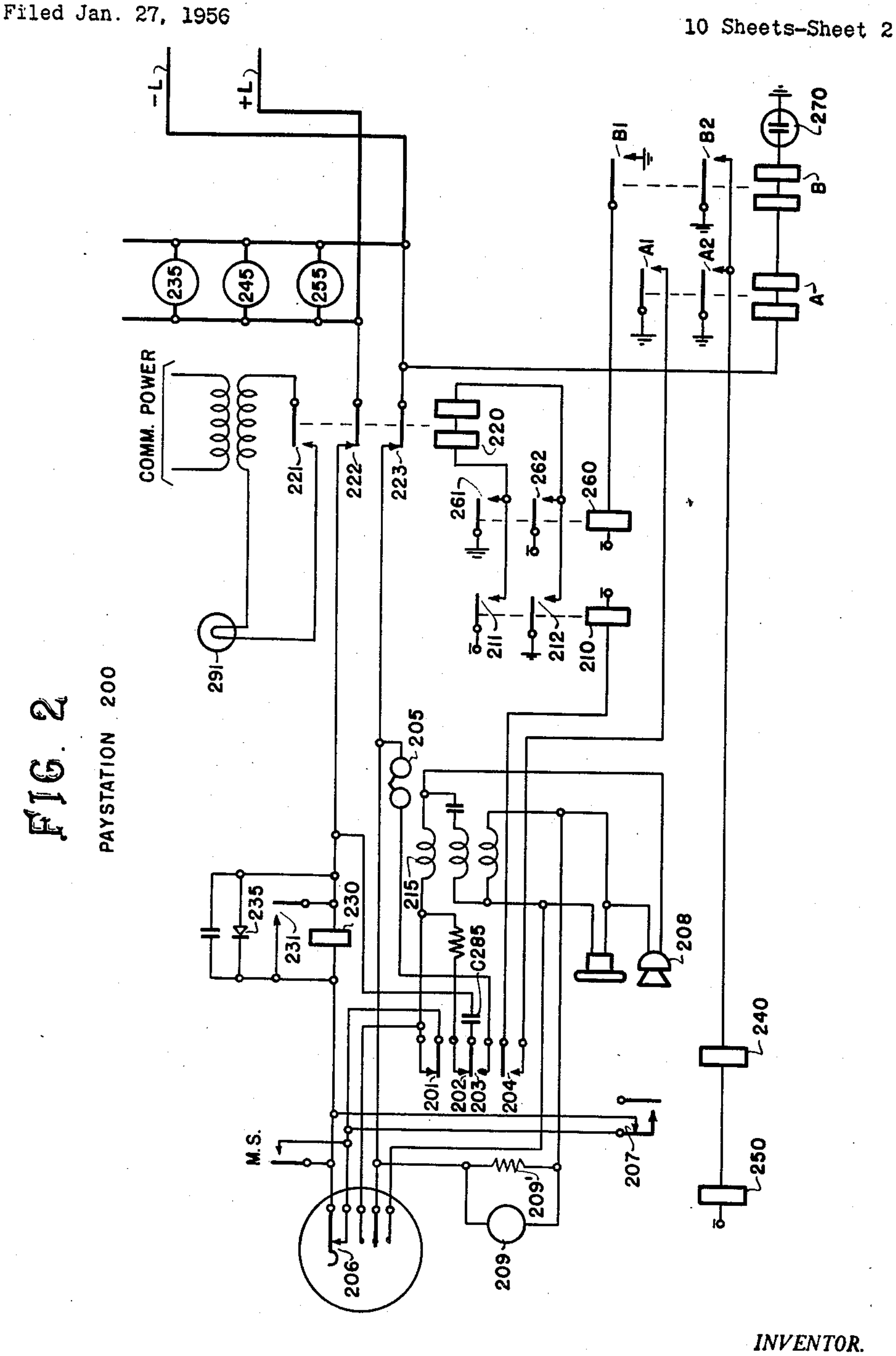

Fig. 2 discloses the details of a prepay postpay party line paystation circuit 200. This circuit is utilized with a mechanism of the type disclosed in U.S. Patent 2,905,-763, issued September 22, 1959, to Hans Sengebusch, whereby the station is converted from a prepay position to a postpay position on completion of a call and reconverted to a prepay position on release of the call so that the paystation functions as a prepay postpay type paystation. The Sengebusch mechanism was originally disclosed as functioning with the types of circuits illustrated in U.S. Patent 2,921,980, issued January 19, 1960 to C. E. Lomax.

Figure 3:
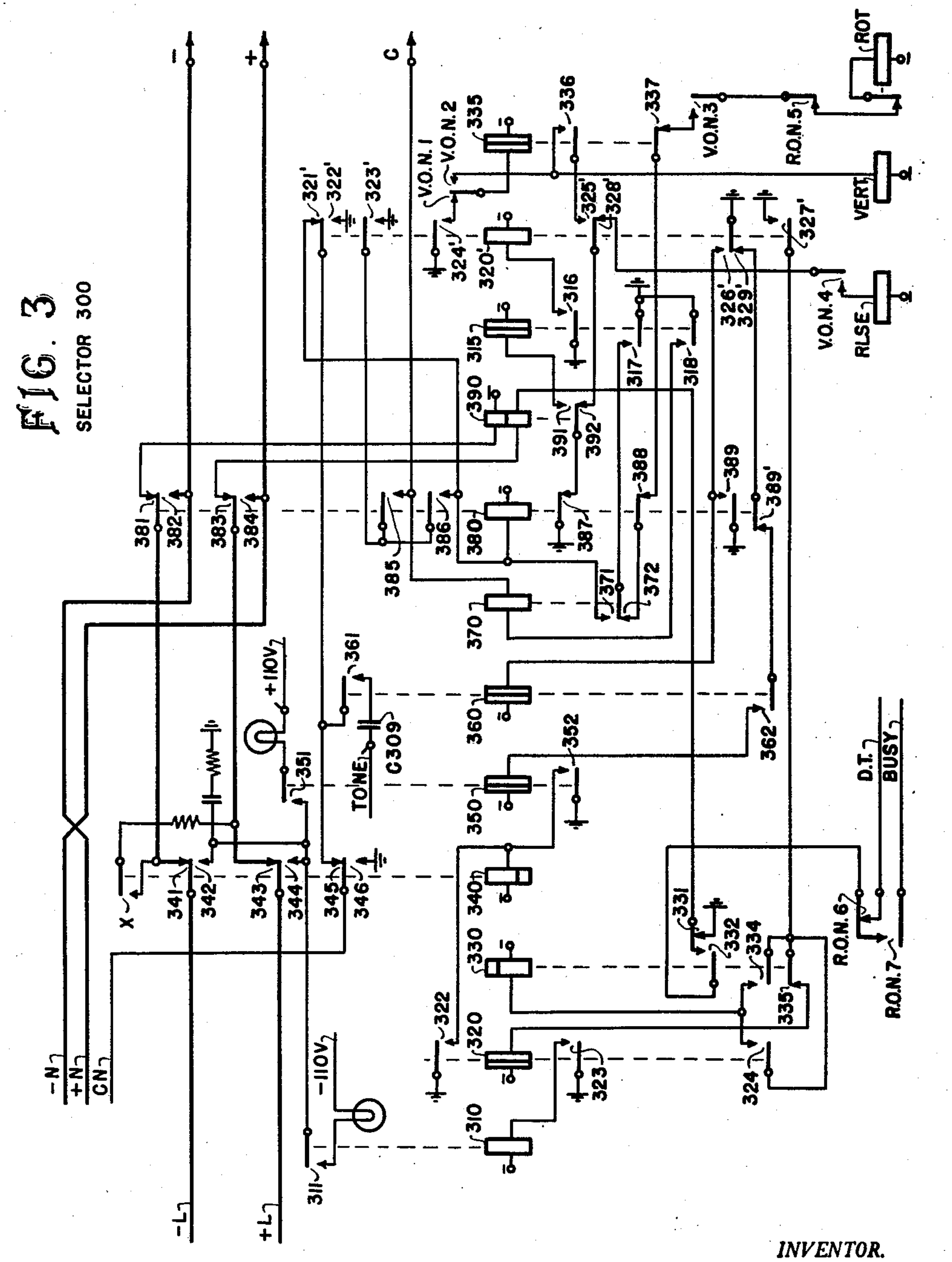

Fig. 3 discloses the details of the Selector Switch utilized with the prepay postpay party line paystation such as 200.

Figure 4:
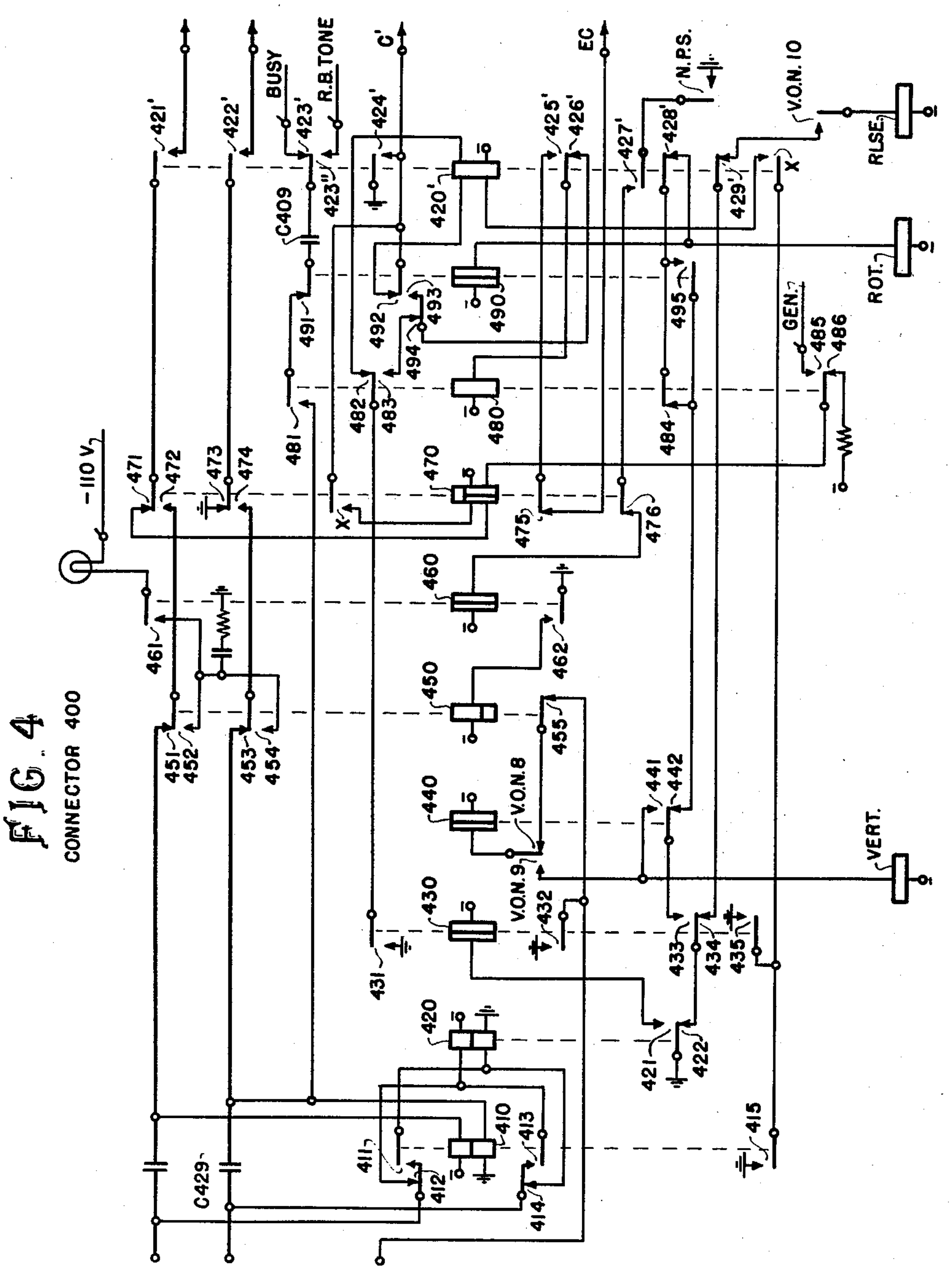

Fig. 4 discloses the details of the Connector Switch 400 utilized by each station in the system.

Figure 5:
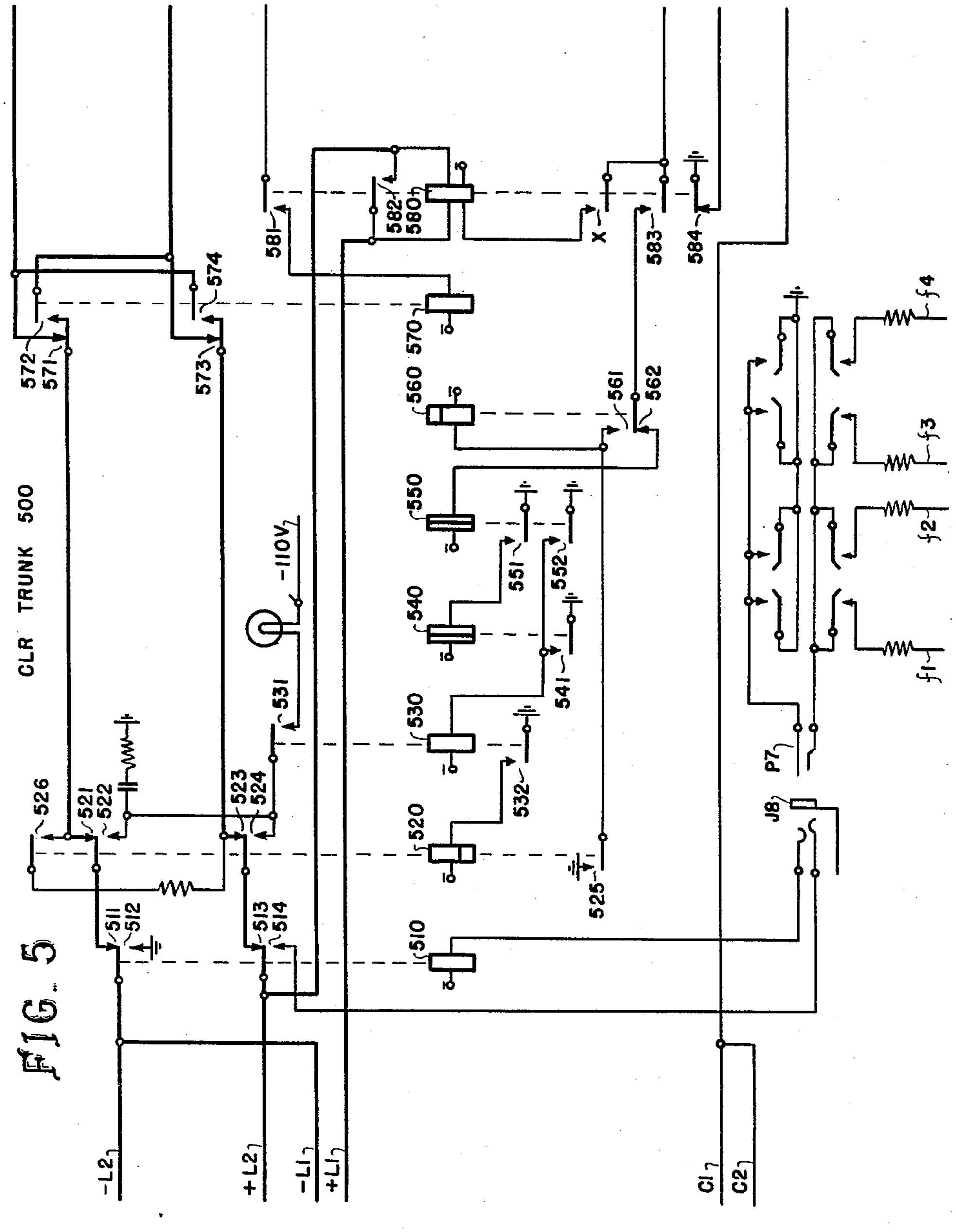
Figure 6:
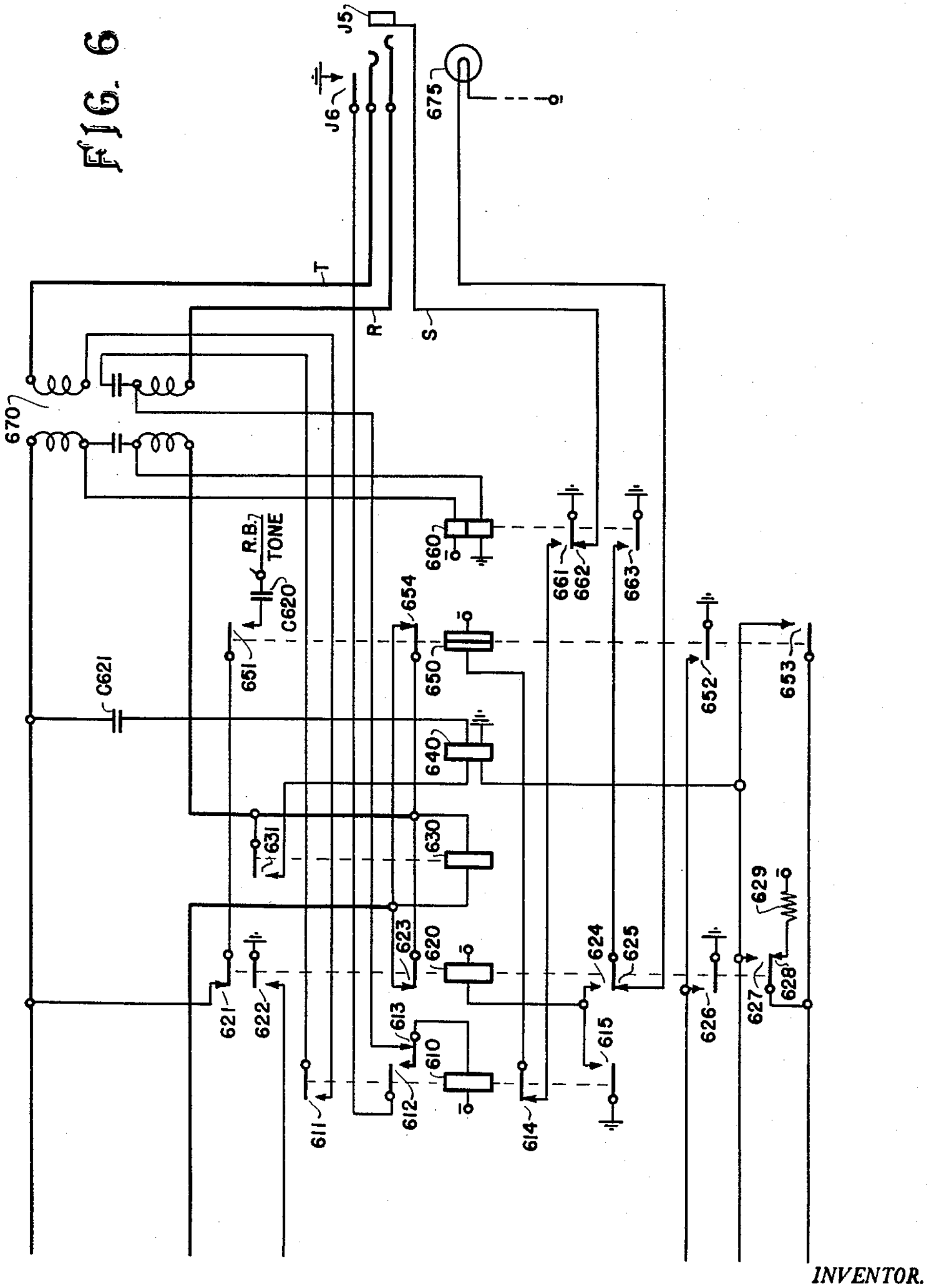
Figure 7:
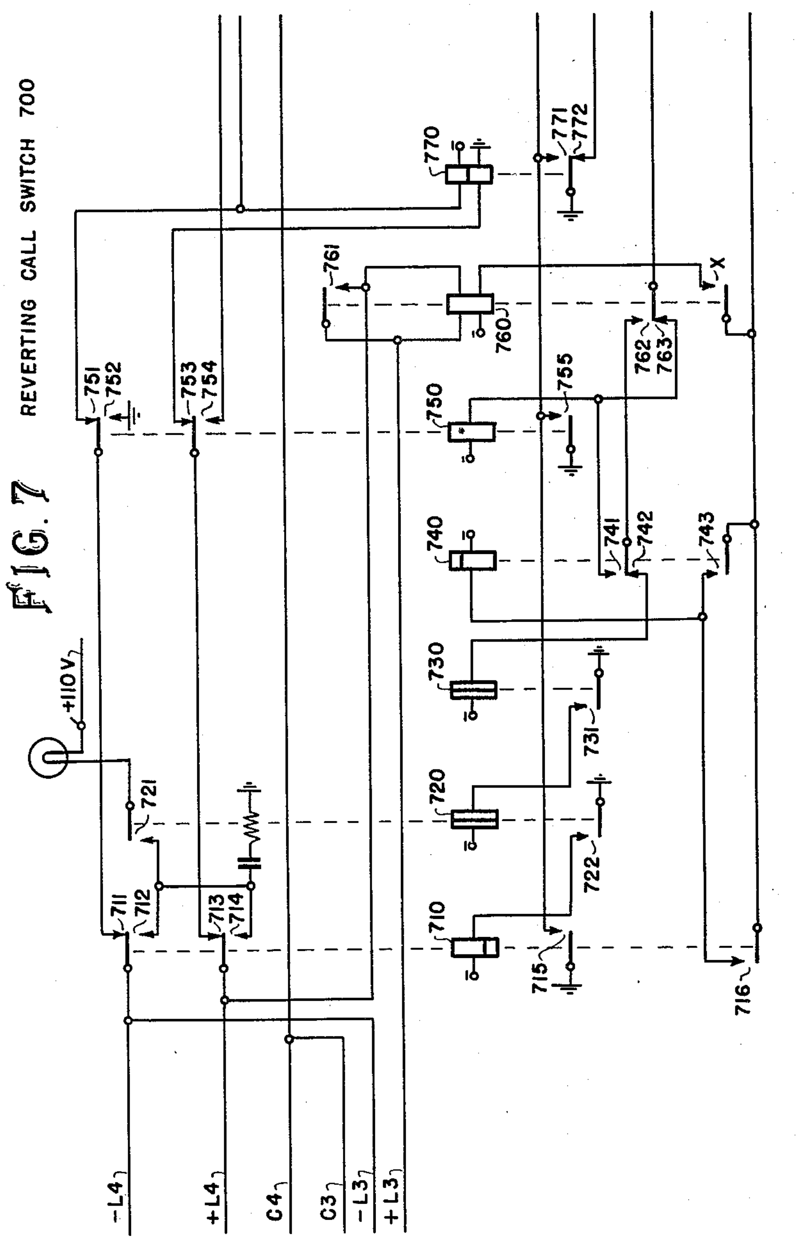
Figure 8:
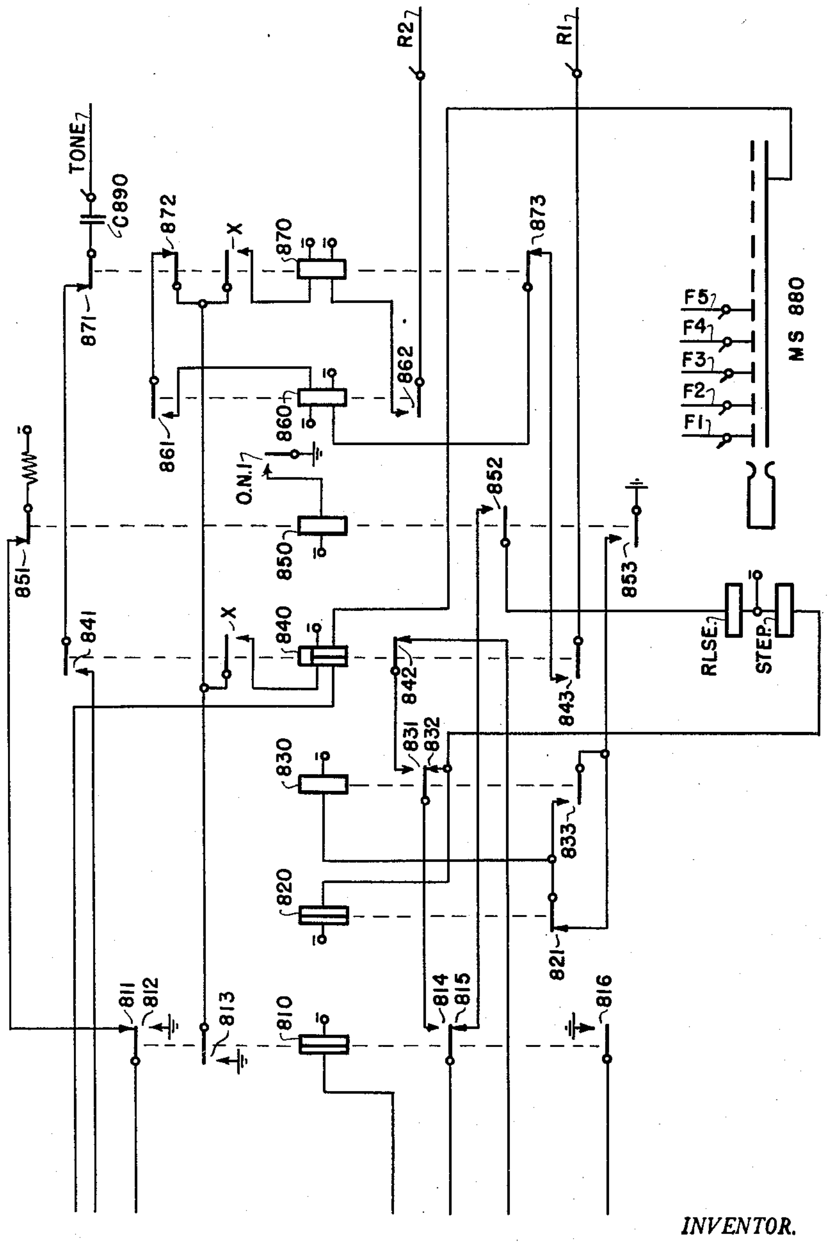

Figs. 5 and 6 disclose the details of the CLR trunk 500 utilized by each station in the system, and Figs. 7 and 8 disclose the details of the Reverting Call Switch 700 utilized by each station in the system. The CLR trunk otherwise known as a combined line recording trunk is used for the purpose of enabling an operator to extend and/or record a call.

Figure 9:
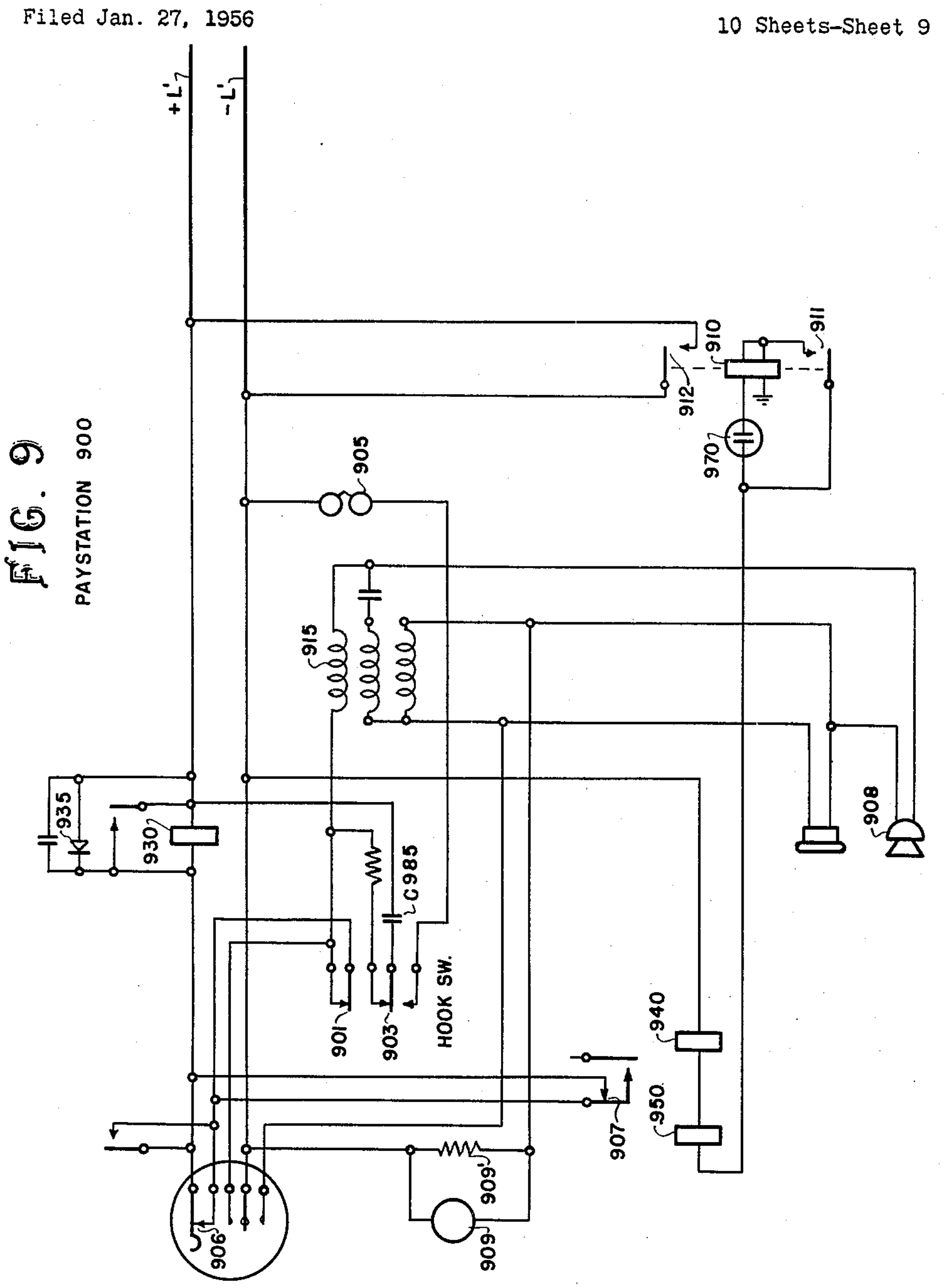

Fig. 9 discloses details of the prepay postpay paystation circuit 900 having a line individual thereto, and utilizing the aforementioned type of mechanism for converting the paystation from a prepay position to a postpay position and back to a prepay position at the required times.

Figure 10:
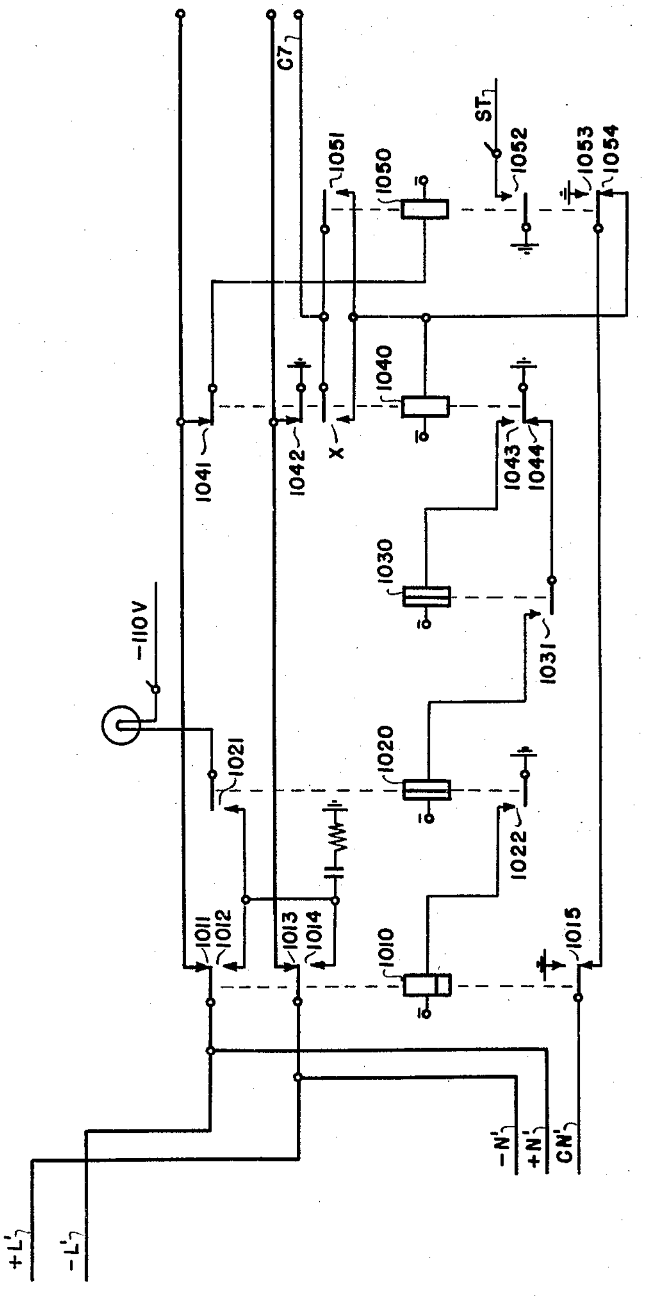

Fig. 10 discloses the details of the line circuit 1000 to be used with the prepay postpay paystation circuit 900.

Each finder, selector and connector switch utilized in the present invention is provided with the well-known Strowger type step-by-step switch mechanism, although other types might be used as well. The Selector Switch 300 (Fig. 3) for the prepay postpay paystation party line is individual to the party line, as only a few such party lines are used in the system. This eliminates the need to provide apparatus used by a station such as 200 (Fig. 2) in each selector switch accessible to other stations in the system. Being individual to the party line, it also contains the apparatus for performing the functions of a line circuit. The finders and selectors utilized with paystation 900 contain circuits of any well-known type for performing their respective functions and are illustrated by a block in the center of Fig. 1 marked Link 300A. A line circuit 1000 (Fig. 10) individual to station 900 is provided for controlling the extension of a call therefrom or thereto, and certain operations of the aforementioned prepay postpay type mechanism. Links such as 300A are used exclusively by prepay postpay paystations such as 900. A similar type of link arrangement indicated by block 300A' in Fig. 1 is used with the station 900A, which may be of any well-known type connected to a single station line or a party line. Station 900A uses an appropriate line circuit of any well-known type such as that indicated by the block 100 (Fig. 1) for extending a connection therefrom to a finder-selector link such as 300A' in any well-known manner. With an arrangement whereby selectors individual to a particular type of station are associated therewith on a call, connections corresponding to the type of calling station are provided from the banks thereof. This permits the CLR trunks and Reverting Call Switches respectively to perform the functions necessary to the respective types of calling stations.

Each station extends a regular local call through an associated selector switch by dialling the first digit of a called subscriber's number thereon to step the selector to a corresponding level. If the call is being extended from a prepay postpay paystation the proper coin value must be deposited before dialling is initiated, and if the call is from station 200, the Selector 300 returns —110 volt lock-out potential for the purpose of locking out the non-calling stations on the party line. Each of the selectors is of the battery searching type, and each searches for an idle connector switch on being stepped to an appropriate level. On finding Connector Switch 400 (Fig. 4) idle, a selector switch seizes that connector. The calling subscriber dials the remaining digits of the called party's number to step the connector switch to a position corresponding to the called party's connector bank terminals. The connector switch tests for the busy or idle condition of the called line and on finding an idle connector extends ringing current thereto. All lines are arranged on a terminal per station basis in the connector banks, as disclosed in U.S. Patent 2,773,126, issued December 4, 1956, to C. E. Lomax. On a call to a party line station a ringing frequency individual to the station on the party line is selected when the connector comes to rest on the station terminals in the manner described in the just mentioned patent to Lomax. The called station is then rung accordingly.

On calls to a prepay postpay party line paystation only, the connector switch forwards —110 volt lock-out potential to the called line to ensure that all stations, but the called station are disconnected, when the called station answers. Battery and ground are then forwarded from the connector switch over the reversed connector line normals to operate the collect relay such as 230 (Fig. 2) at a called prepay party line paystation. This causes the paystation to be thrown into the postpay position. Throwing a called paystation into the postpay position is important on a reverse charge toll call to enable deposited coins to be collected without any further operations. A relay such as 930 (Fig. 9) at called prepay postpay paystation 900 is operated in a similar manner on a call thereto to throw that station into the postpay position. On answer the connector also reverses battery to the calling station. If the calling station is a prepay postpay paystation, a relay such as 230 in the case of station 200, or a relay such as 930 in the case of station 900 is operated thereat to throw the calling station into the postpay position. Whether the aforementioned lock-out potential is forwarded to the called line is determined by a set of normal post springs N.P.S. in the connector, which are closed if the connector is stepped to the paystation party line level.

On calls to a toll operator the selector switch searches for an idle CLR Trunk 500 (Fig. 5) on being stepped to the appropriate level, by searching for battery, and on finding the same seizes the CLR trunk. The seized CLR trunk causes refund potential to be returned to a calling paystation to refund the initial deposit in the event the call is from a paystation. On answer by the operator it reverses battery on the line conductors to the calling station. This causes a calling prepay postpay paystation to be thrown in the postpay position as mentioned before. The operator on extending the call, requests a deposit from the calling subscriber at the paystation. As large a deposit as necessary is now collected without the necessity of performing a collect operation as the paystation is in the postpay position.

On reverting calls the calling station, after being switched through to an idle Reverting Call Switch 700 (Fig. 7) from a battery searching selector, dials the last digit of the called party's number only. In the case of a call from a prepay postpay paystation only, the reverting call switch returns unlocking and refund potential. This unlocks all the stations on the paystation party line if the call was from the party line and also refunds the initial deposit at the calling paystation. A minor switch MS880 (Fig. 8) in the Reverting Call Switch 700 is stepped to an appropriate position by the last dialled digit to select a ringing frequency corresponding to the called party's ringer. The calling party hangs up and the ringing frequency is returned over the line conductors to operate the called party's ringer. The calling party must wait before coming back on the line to give the called party an opportunity to answer the call. A tone signal is provided in the switch 700 so that if the called party answers he knows a reverting call is being made and that he would wait for the calling party to come back on the line. The calling party on coming back on the line receives the tone signal if the called party has not answered and therefore he hangs up.

The foregoing is a general description of the invention, which is supplemented by the following detailed description of the specific embodiment of the invention disclosed herein.

*Prepay postpay party line paystation 200*

A subscriber at the party line prepay postpay paystation 200 initiates a call by lifting his handset to close hookswitch springs 201 and 202 and open hookswitch springs 203 and 204. Opening hookswitch springs 203 disconnects ringer 205 from the line, while hookswitch springs 204 open an incomplete circuit for relay 210. Hookswitch springs 201 complete a loop circuit for the line relay 390 of the party line paystation Selector 300 (Fig. 3) individual to the party line. The loop circuit is completed from ground at contacts 331 through the lower winding of relay 390, contacts 383, 343, the +L conductor to Fig. 1, contacts 222, rectifier 235 in shunt with collect relay 230, dial springs 206 in shunt with coin springs 207, hookswitch springs 201, coil 215, transmitter 208, coin transmitter 209 in shunt with resistor 209′, contacts 223, the —L conductor to Fig. 2, contacts 341 and 381, and the upper winding of relay 390 to battery. The collect relay 230 does not operate, as it is shunted by rectifier 235.

Relay 390 operates in the described loop circuit to close contacts 391 and open contacts 392. Opening contacts 392 opens a point in the incomplete circuit to the release magnet RLSE, while closing contacts 391 completes a circuit from ground at contacts 387 over contacts 391 to slow-to-release relay 315. Relay 315 operates to close contacts 316, 317, and 318. At contacts 317 a point is prepared in an incomplete circuit to the rotary magnet, while at contacts 318 ground is forwarded through relay 370 to the C wiper. At contacts 316 a circuit is completed to relay 320′. Relay 320′ operates to close contacts 322′, 323′, 324′, 325′, 326′, and 327′ and opens contacts 321′, 328′, and 329′. Contacts 329′ open a point in an incomplete circuit to relay 350, while contacts 328′ open another point in an incomplete circuit to the release magnet. Opening contacts 321′ removes battery from the CN conductor while closing contacts 322′ grounds the CN conductor over contacts 345 to busy the switch and the party line to incoming calls. Closing contacts 323′ prepares a circuit for relay 380, while closing contacts 324′ completes a circuit over the springs V.O.N. 1 to slow-to-release relay 335. Another circuit for relay 335 and a circuit for the vertical stepping magnet is prepared at contacts 325′. Relay 335 operates to close contacts 336 to further prepare the other circuit, and it also opens contacts 337 to open a point in the incomplete circuit to the rotary magnet.

In the meantime, contacts 326′ on closing, operated slow-to-release relay 360, which closed contacts 361 to prepare a point for forwarding identification tone. It also closed contacts 362 to prepare a circuit to relay 350. Relay 350 controls the return of unlocking and refund potential to the calling line on release of the call.

Contacts 327′, which closed on operation of relay 320′, completed a circuit to slow-to-release relay 320 over contacts 335. Slow-to-release relay 320 operates. At contacts 322, a circuit is completed to slow-to-operate relay 340, and at contacts 323 a circuit is completed to relay 310. At contacts 324 a circuit is completed from ground at contacts 327′ to slow-to-operate relay 330 and it operates its contacts to complete its own holding circuit through contacts 334 and 327′. Relay 340 operates to close its X contacts first and complete a loop to relay 390 including contacts 381, 331 and 383 as the original loop to relay 390 is opened at contacts 341 and 343. Contacts 341 and 343 open immediately thereafter to disconnect the original loop circuit for relay 390, however, relay 390 is held operated over the X contacts of relay 340 as just explained. Contacts 342 and 344 closing, enable the —110 volt lock-out potential to be applied from contacts 311, which were closed when relay 310 operated, to the —L conductor and +L conductor respectively. From there the —110 volt potential is applied to an arrangement such as relays A and B and neon tube 270 in series at each station. The neon tube at each station fires because the voltage across its terminals is greater than its striking voltage and current flows through relays A and B and the tube. Relay A at each station is polarized to operate on the —110 volt potential, while relay B is polarized to operate on +110 volts so that only relay A at each station operates now. It closes contacts A1 and A2. Closing contacts A1 at the calling station is ineffective as the circuit to relay 210 is open at hookswitch springs 204, but at all other stations on the party line a relay such as 210 is operated when contacts such as A1 thereat close. The relay such as 210 at each non-calling station operates to close contacts corresponding to 211 and 212, resulting in the operation of the lock-out relay such as 220 at each non-calling station. The lock-out relay at each non-calling station closes contacts such as 221 to light a lamp such as 291 for indicating that the party line is in use. It also opens contacts such as 222 and 223 at each non-calling station to disconnect the +L and —L line conductors from the non-calling pay stations thereby rendering these stations ineffective to extend or receive calls. It may be noted that contacts such as A2 at each station are closed by each operated A relay to operate the refund relay and the nickel coin spring reset magnet such as 240 and 250 respectively to refund any coin on deposit and reset the unset nickel springs if either situation exists.

Relay 340 in the selector also closes contacts 346 to ground the CN conductor to prevent a connector from finding the line idle during the period contacts 345 are open. Slow-to-operate relay 330, on operating, opens the original operating circuit for relay 320 at contacts 335. It also forwards dial tone with ground superimposed thereon from springs R.O.N. 6, and contacts 332 through the lower winding of relay 390. The dial tone ground maintains relay 390 operated, despite the removal of the original ground at contacts 331. Slow-to-release relay 320 starts to release, and after a period of time opens its contacts to restore relays 310 and 340 at contacts 322 and 323 respectively. The original loop with the exception that dial tone and ground are now returned from R.O.N. 6 is completed when relay 340 restores to close contacts 341 and 343. The X contacts of relay 340 are maintained closed until contacts 341 and 343 close to ensure that a loop to relay 390 is completed. Restoration of contacts 311 or 342 and 344 removes the −110 volt potential from the line to restore the relay such as A at all the stations. Operated relays and magnets such as 210, 240 and 250 respectively now restore, but as the lock-out relays such as 220 have stay-put polar armatures, those that are operated maintain their respective stations disconnected from the line after they are deenergized.

The calling subscriber cannot operate his dial springs 206 effectively due to the shunt provided by coin springs 207. On hearing the returned dial tone, the calling subscriber deposits the prescribed coin value. If he deposits one nickel, coin springs M.S. are closed to maintain a shunt around dial springs 206, while coin springs 207 are opened. Deposit of a second nickel opens the M.S. springs, while the deposit of a dime in the first instance opens the coin springs 207 without closing springs M.S. The calling party can therefore effectively operate dial springs 206 for the purpose of operating the call extending switches.

The calling party operating his dial springs 206, after the proper deposit, opens and closes the loop to relay 390 a number of times corresponding to the dialled digit. The digit dialled determines the level to which the switch is stepped to and on reaching that level it automatically searches for a succeeding switch. In the case of a regular local call the subscriber dials the first digit of the called party's number, which may be any digit from 2–9 inclusive. If he desires to make a toll or reverting call he dials the digit 0 or 1 respectively. Relay 390 is pulsed accordingly to intermittently close contacts 392 and intermittently open contacts 391. Contacts 391 open the circuit to relay 315 intermittently, but as it is slow-to-release, it remains operated during the period the digit is dialled. Contacts 392 on closing complete a circuit from ground at contacts 387 over contacts 392, 325', and 336 to the vertical stepping magnet.

The vertical stepping magnet is pulsed a number of times corresponding to the dialled digit due to the intermittent opening and closing of contacts 392 so that it steps the selector switch to a level corresponding to the dialled digit. When the selector switch takes its first step, springs V.O.N. 1 and V.O.N. 3 open, while springs V.O.N 2 and V.O.N. 4 close. The original circuit for relay 335 is opened at springs V.O.N. 1, however, a circuit is now completed therefor from contacts 387, 392, 325', 336 and springs V.O.N. 2. Relay 335 is slow-to-release, and therefore remains operated during the dialled digit, despite the intermittent opening of contacts 392. Springs V.O.N. 4 on closing prepare a circuit to the release magnet. Relay 335 maintains a circuit to the rotary magnet open at contacts 337.

At the end of the dialled digit contacts 392 are maintained open and contacts 391 are again maintained closed. The vertical magnet therefore remains deenergized and relay 335 releases after an interval. Contacts 337 close to complete a circuit to the rotary magnet over contacts 317, 372, 388, 337, springs V.O.N. 3, springs R.O.N. 5 and the rotary magnet self-interrupting contacts. Contacts 336 open to open another point in the circuit to relay 335 and the vertical stepping magnet.

The rotary stepping magnet now steps the selector switch wipers in a self-interrupted manner over the selector bank contacts to hunt for an idle connector switch, if one of the digits 2–9 was dialled. When the C wiper encounters battery, indicating an idle connector switch, over contacts such as 455 in Connector Switch 400 (Fig. 4), springs V.O.N. 8 and through a relay such as 440, relay 370 is energized over contacts 318. Relay 370 opens contacts 372 to prevent the rotary magnet from stepping the selector beyond this point and at contacts 371 completes a circuit for relay 380 from ground at contacts 317. Relay 380 operates to open contacts 381, 383, 387, 388 and 389'. Opening contacts 389' opens a point in the incomplete circuit to relay 350, while opening contacts 388 opens another point in the now incomplete circuit to the rotary magnet. Opening contacts 387 disconnect the circuit to slow-to-release relay 315, and it starts to restore. Contacts 389 close to maintain relay 360 operated, as relay 320' will restore immediately after relay 315 to open the original circuit for relay 360. At contacts 381 and 383 the loop circuit to relay 390 is opened, and dial tone is removed from the line. The loop circuit extending from Paystation 200 and through Selector 300 is now completed over contacts 382 and 384, the − and + wipers respectively, contacts 412 and 414 to battery and to ground respectively through the upper and lower windings respectively of the connector switch line relay 420 (Fig. 4). Ground is initially forwarded from contacts 317 and 371 to the C wiper before relay 315 restores, and also over contacts 455 and springs V.O.N. 12 in Fig. 4 to battery through relay 440. Relay 370 is shunted, when relay 380 operates, by the ground forwarded from contacts 323' to 385, and it restores. In the meantime ground from contacts 323' returned over contacts 386 maintains relay 380 energized while relay 315 is restoring.

*Prepay postpay paystation 900*

The subscriber at a prepay postpay paystation such as 900 having a line individual thereto initiates a call in the same manner as described for a party on the party line paystation line. However, instead of being connected directly to a selector switch he lifts his handset to operate a line relay in his line circuit as follows: ground at contacts 1042 (Fig. 10), contacts 1013, +L', conductor, rectifier 935 in shunt with collect relay 930, dial springs 906 in shunt with springs 907, hookswitch springs 901, inductance 915, transmitter 908, coin transmitter 909 in shunt with resistor 909', the −L' conductor, and contacts 1011 to battery over contacts 1041 through relay 1050. Relay 1050 operates to close contacts 1051 to place battery on lead C7 and prepare a circuit for relay 1040. At contacts 1052 a circuit is completed for causing an allotter to associate an idle finder selector link 300A with the calling line all in any well-known manner. The finder switch of the link 300A on finding battery over lead C7, contacts 1051 and relay 1040, returns ground over the C7 lead to operate relay 1040 all in any well-known manner. Relay 1040 closes its X contacts first. It then opens contacts 1041, 1042, and 1044. The loop circuit to relay 1050 is now opened and the loop is extended to the line relay of the selector switch of the link 300A in any well-known manner. At contacts 1043 a circuit is completed to slow-to-operate relay 1030. It energizes and closes contacts 1031 to prepare a circuit for relay 1020.

The calling party dials the first digit of the desired number on the selector switch after first depositing the required coin value to open the shunt around the dial springs 906 in the same manner as has been explained for paystation 200. The selector switch is operated to the level corresponding to the dialled digit in any well-known manner and there it searches for and finds an idle switch of the type associated with the particular level.

*Connector switch 400*

Relay 420 in the connector switch operates when the loop circuit is extended thereto either through Selector Switch 300 as explained or in any well-known manner by the selector switch of link 300A. It will be understood that a subscriber at a station such as 900A extends a loop to relay 420 in any well-known manner through a link such as 300A'. Slow-to-release relay 440 operates from ground forwarded over the C wiper. Relay 420 closes contacts 421 and opens contacts 422. The latter contacts open a point in an incomplete circuit to the connector switch release magnet, while the former contacts complete a circuit to slow-to-release relay 430. Relay 430 operates to close contacts 431 and forward ground over contacts 482, the upper winding of relay 420 and over contacts 492 to the connector switch wiper C'. Contacts 432 close to return ground back over the selector switch C wiper. In the case of Selector 300, ground is then returned over contacts 385 and 386 to maintain relay 380 energized before relay 320' is restored by the release of slow-to-release relay 315. The ground returned over contacts 385 and 386 is returned over contacts 321' and 345 to maintain the calling line busy to incoming calls at CN. At contacts 433, relay 430 prepares a circuit for relay 440 and the vertical stepping magnet, while at contacts 435 it prepares a circuit for the lower winding of 420'. Slow-to-release relay 315 in Selector 300 is now restored. At contacts 316 it restores relay 320' which in turn restores relay 330 at contacts 327'. Relay 320' maintains a ground at contacts 323' for holding relay 380 operated until relay 430 is fully operated to return ground over the C wiper for holding relay 380 operated. A similar function is performed by the selectors of the link 300A and 300A' respectively on respective calls extended therethrough to an idle connector switch.

Relay 440 on operating closes contacts 441 to prepare a holding circuit for itself and an energizing circuit for the vertical stepping magnet. It will be noted that the paystation identification tone forwarded over condenser C309 in Selector 300, contacts 361, 321', contacts 386, 385, the wiper C, contacts 455 and springs V.O.N. 8 to relay 440 is ineffective at this time. A similar paystation tone furnished from link 300A is also ineffective at this time.

The calling party operates his dial springs such as 206 in the case of station 200 to pulse relay 420 over the loop circuit thereto. Contacts 422 are intermittently closed a number of times corresponding to the dialed digit to energize the vertical stepping magnet over contacts 433 and 441 a number of times corresponding to the digit dialled. Relay 430 is slow-to-release and remains operated during the digital period. On the first vertical step, springs V.O.N. 9 close so that relay 440 is now energized over contacts 422, 433, 441, and springs V.O.N. 9. Relay 440 remains operated while the digit is dialled, as it is slow-to-release. Springs V.O.N 10 close on the first vertical step to prepare a circuit to the release magnet. At the end of the digit contacts 421 remain closed and contacts 422 remain open so that relay 440 is restored and the vertical stepping magnet remains deenergized.

Dialling the second digit again pulses relay 420, however, when contacts 422 close, the rotary magnet and slow-to-release relay 490 are now energized over the contacts 422, 433, 442, 484 and 428'. The rotary magnet is deenergized each time contacts 423 open to step the connector switch to the position corresponding to the second dialled digit. Relay 490 being slow-to-release remains operated during the period the digit is dialled. Relay 490 operates on the first closing of contacts 422 to open contacts 491 and 492 and 494, and close contacts 493 and 495. Contacts 491 open to disconnect a point in an incomplete circuit for returning either busy tone or ring back tone to the calling party. Open contacts 492 disconnect the original ground at contacts 431 from the C' wiper, while closing contacts 493 connects the C' wiper through contacts 426' to battery through the winding of relay 480. Contacts 95 close to shunt contacts 484. This is done so that if the C' wiper encounters ground to energize relay 480, while the wipers are being stepped, a circuit will be maintained for relay 490 and the vertical stepping magnet despite the opening of contacts 484.

At the end of the digit, contacts 422 remain open so that relay 490 and the rotary stepping magnet are both deenergized. If the C' wiper is connected to ground in the called party's line circuit, indicating that the called line is busy, relay 480 is energized before relay 490 is completely restored to open contacts 493. Relay 480 closes contacts 481 and 483 and opens contacts 482 and 484. Closing contacts 483 enables relay 480 to complete a holding circuit for itself from ground at contacts 431, over contacts 483, contacts 494 when they close due to the release of relay 490 and contacts 426'. Contacts 481 close to return busy tone from contacts 423', condenser C409, contacts 491 and 481 and condenser C429 and the loop back to the calling party.

In the case of a call to a prepay postpay party line paystation the busy ground is furnished from a CN conductor such as shown in Fig. 3, contacts 345, 321, 386 and 385 and the C' wiper on an outgoing call while on an incoming call the CN conductor is grounded by the incoming connecter switch as will be explained. In the case of a call tto a prepay paystation such as 900 the busy ground is furnished over the conductor such as CN', contacts 1015, 1054, the X contacts of relay 1040 and the C7 lead on an outgoing call, while on an incoming call the ground is furnished from the connector switch. If the call is to a station such as 900A the busy ground is furnished in any well-known manner by the line circuit such as 100 or a connector switch on an incoming call.

If the calling line is idle, battery is extended from one side of the line cut-off relay (not shown) in a line circuit such as 100 in the case of station 900A to wiper C'. When relay 490 restores, a circuit is completed from battery on wiper C' through contacts 492, the upper winding of relay 420', contacts 482 to ground at contacts 431. On calls to a station such as 200 the battery is furnished from relay 380, contacts 321' and 345 and the CN conductor, while on calls to a station such as 900 the battery is furnished from relay 1040, contacts 1054 and 1015 and the CN' conductor. The energized upper winding of relay 420' closes its X contacts to complete a circuit from ground at contacts 435 to its lower winding. Relay 420' is now fully energized and operates all of its contacts. Ground pulses returned over the EC lead from the associated connector bank terminal of the called line circuit cause relay 480 to operate intermittently over contacts 475 and 425'. The last dialled digit of the called station determines what connector bank contact is selected. The selected bank contact has a ground pulse applied thereto simultaneously with the application of the ringing frequency individual to the called station as explained in the last mentioned Lomax application. Relay 480 is thus operated only when the ringing generator is supplying the ringing frequency individual to the called station. At contacts 423'' ring back tone now is returned to the calling party over condenser C409, contacts 491 and 481 and condenser C429. At contacts 429' a point is opened in the incomplete circuit to the connector switch release magnet. At contacts 424' ground is forwarded over the C′ wiper to the line circuit cut-off relay of the called subscriber's line circuit to operate that relay over the previously described circuit for providing battery from that relay. This ground is applied to the CN conductor of the called line and busies it to other incoming calls. Relay 380 is the operated line cut-off relay, if the call is to a station such as 200, and relay 1040 is the operated line cut-off relay if the call is to a station such as 900. Each when operated disconnects the associated line relay.

If the called line is a party line with lock-out the first digit dialled on the connector switch steps the switch to a corresponding level, where normal post springs N.P.S. are closed in any well-known manner. If relay 420′ is later operated, ground is forwarded over contacts 427′ and 476 to operate slow-to-operate relay 460. It then closes contact 461 to forward —110 volt lock-out potential. Slow-to-operate relay 450 is operated at contacts 462 to extend the —110 volt potential past contacts 452 and 454.

The incomplete circuit to relay 490 and the rotary stepping magnet is now also open at contacts 428′. Interrupted generator is applied to the called party's ringer from contacts 485, lower winding of relay 470, contacts 471, contacts 421′, the ringing loop to the called party; back over contacts 422′ and 473 to ground. In the case of station 200 the ringing loop includes the —N conductor, contacts 384 and 343, the +L conductor, contacts such as 222, condenser C285, hookswitch springs 203, ringer 205, contacts 223, the —L conductor, contacts such as 341 and 382 and the +N conductor. Although the other station ringers are also connected only the ringer individual to the applied ringing frequency is operated. This is because relay 480 is operated to close contacts 485 only during the ringing intervals that the desired frequency is available. The comparable ringing loop for a station such as 900 comprises the —N′ conductor, +L′ conductor, condenser C985, hookswitch springs 903, ringer 905, the —L′ conductor and the +N′ conductor. In the case of station 900A, the ringing loop is well-known.

When the called party answers, a D.C. loop circuit is completed, when relay 480 is restored. This circuit extends from battery at contacts 486 through the lower winding of slow-to-release relay 470, contacts 471, 421, the D.C. loop through the called party's substation circuit and back over contacts 422′ to ground at contacts 473. The D.C. loop at a station such as 200 is extended to the +L and —L lead as described for the ringing current and includes contacts 222, collect relay 230, springs 206 in shunt with 207, springs 201, coil 215, transmitter 208, coin transmitter 209 in shunt with resistor 209′, and contacts 223. As battery is provided to the +L lead, rectifier 235 can no longer shunt relay 230 and it operates. The D.C. loop at a station such as 900 includes the corresponding elements. At a station such as 900A this loop circuit is completed in any well-known manner. In the connector switch relay 470 is energized to operate its X contacts to complete a circuit for its upper winding through contacts 424′. The energized upper winding of relay 470 operates all of its contacts to disconnect the circuit for its lower winding at contacts 471 and 473 and extends the D.C. loop from the called party's station over contacts 472 and 451 to battery through the upper winding of relay 410 and from contacts 474, over contacts 453 to ground through the lower winding of back bridge relay 410. At contacts 475 it opens the circuit for pulsing relay 480, and at contacts 476 it opens the incomplete circuit to relay 460. Relay 480 restores to cut off the ring back tone at contacts 481 and the generator remains cut off as contacts 485 remain open.

If relays 450 and 460 are operated indicating a call to a party line with lock-out, the loop to the called station is first extended to contacts 452 and 454 so that —110 volt lock-out potential is forwarded over the —L and +L conductors to all the stations on the line to operate a relay such as A at each station. The lock-out relay at the non-called stations is then operated as explained on the initiation of a call from Paystation 200. The circuit to relay 460 is opened at contacts 476 when relay 470 is fully operated. As relay 460 is slow-to-release it remains operated long enough to fully apply the lock-out potential after which both it and relay 450 restore. The delay in 450 restoring allows condenser C456 to absorb the inductive kick from the relays at the stations. Relay 450 being restored also connects the called station loop to relay 410 as described.

Relay 410 operates to close contacts 411 and 413 and open contacts 412 and 414. This reverses the battery on the loop to the calling party from relay 420 so that the rectifier 235 at the calling paystation such as Paystation 200 no longer shunts collect relay 230, and it operates. It closes contacts 231 to shunt itself and causes the deposited coin to be collected. Contacts 231 are held closed in a manner described in the aforementioned Sengebusch application despite the deenergization of relay 230. Relay 230 before it is deenergized also throws the calling paystation into the postpay condition so that any coin deposited thereafter is collected by virtue of its deposit alone. If paystation 900 is the calling station, the collect relay 930 thereat is operated in the manner just explained for relay 230 to throw the paystation 900 into the postpay condition. Contacts 415 also close to complete an alternate circuit for the lower winding of relay 420′. It will be noted that ground and battery were furnished to a called line prepay postpay paystation in a direction to operate the collect relay such as 230 or 930 thereat. The operation of collect relay thereat throws the called paystation into the postpay position. The parties may now converse.

*CLR trunk 500*

In the event that a call is being extended to a toll operator, the calling subscriber dials the toll operator's digit 0 on the selector switch to step it to the 10th level. The selector switch on stepping to the 10th level begins an automatic searching operation to find the idle CLR trunk in the same manner as described in searching for an idle connector switch. The selector switch of link 300A and Selector Switch 300 test for battery over lead C1, contacts 628 and resistance 629. Relay 370 in Switch 300 or the corresponding relay in link 300A operate from battery over lead C1 to extend the loop over the associated CLR conductors —L1 and +L1 respectively, contacts 511, 521, 571, the upper primary of repeating coil 670 to battery through the upper winding of relay 660, and also through the upper winding of relay 580, over contacts 513, 523, 573, relay 630 in shunt with contacts 623 and 654 and then through the lower primary of repeating coil 670 to ground through the lower winding of relay 660 respectively. The selector switch of link 300A′ tests for battery over the same test circuit with the exception that lead C2 is used instead of C1. It extends a loop from the calling subscriber to relay 660 over conductors +L2 and —L2. Relay 580 is therefore not in this loop circuit to relay 660. Relay 630 does not operate in the loop circuit, because of the shunt provided at contacts 623 and 654. Relay 580, which is in the loop circuit on a call from a prepay postpay paystation, operates its X contacts for a purpose to be described shortly. Relay 660 operates, and completes a circuit through contacts 661 and 614 to slow-to-release relay 650, and it operates. At contacts 663 a circuit is completed through contacts 625 to light the calling signal lamp 675 at the operator's position for the purpose of signalling her that a call is waiting. Relay 650 on operating closes contacts 651 to forward ring back tone over the loop to the calling party through condenser C620 and contacts 651 and 621. At contacts 652 a circuit is prepared to the lower winding of relay 580, if it is operated. At contacts 653 ground is returned over the C1 and C2 conductors from the lower winding of impedance 440, and also from contacts 584, while at contacts 654 one of the shunts around relay 630 is removed. Returning ground over the C1 conductor and the C wiper maintains relay 380 in the Selector Switch 300 operated in a manner already described. Relay 370 therein is of course restored as before described. Relay 380 holds relay 360 operated to forward the paystation identification tone over the C wiper as previously explained. The identification tone is now forwarded over the C1 conductor to the lower winding of impedance 640 in shunt with contacts 584. A similar arrangement for link 300A enables a paystation identification tone to be forwarded therefrom if the CLR trunk is seized therefrom. Link 300A' is controlled over lead C2 in a similar manner except that only the ground from the lower winding of 640 is furnished thereto and no paystation tone is forwarded therefrom.

The upper winding of relay 580, which is energized on a call from a prepay postpay paystation, closes its X contacts as previously mentioned to energize its lower winding from ground at contacts 652. It now operates all of its contacts to remove ground at contacts 584 from the C1 conductor and the shunt from the lower winding of impedance 640. Ground however is furnished to the C1 conductor from the lower winding of impedance 640. Contacts 581 close to prepare a circuit to relay 570, while contacts 582 close to shunt the upper winding of relay 580 from the loop circuit to relay 660. At contacts 583 it completes a circuit to slow-to-release relay 550 over contacts 562 and including contacts 652.

Relay 550 operates to close contacts 551, and slow-to-release relay 540 operates. It also closes contacts 552 to operate relay 530. Relay 540 closes contacts 541 to complete another circuit for relay 530. Relay 530 operates to close contacts 531 to prepare a circuit for returning −110 volt refund potential to the calling paystation and at contacts 532 completes a circuit to slow-to-operate relay 520. Relay 520 operates to close contacts 526 for maintaining an operating circuit for relay 660, while it opens contacts 521 and 523 to disconnect the previously described loop circuit to relay 660. At contacts 522 and 524, it completes a circuit for returning −110 volt refund potential from contacts 531 over both sides of the loop to the calling station to operate relay A thereat in a manner explained, when the lockout pulse was returned thereto from the Selector Switch 300 on initiation of a call. Relay A closes contacts A1 and A2, the latter completing a circuit for operating refund relay 240 and magnet 250. Magnet 250 operates for no purpose at this time as a dime was deposited to enable initiation of the dial operation, while relay 240 operates to refund the deposit and maintain the Paystation 200 in the prepay position. Contacts A1 complete a circuit to a relay such as 210 at the non-calling stations only. That relay at the non-calling station is energized to ensure that with the exception of Paystation 200 they are locked out. If the call had been initiated from Paystation 900 the −110 volt refund potential is applied over the line conductors to relay 940, magnet 950, neon tube 970 and the upper and lower windings of relay 910 all in series. Due to the high voltage tube 970 breaks down and conducts to energize 910. Relay 910 closes contacts 911 to shunt tube 970 and its own upper winding. The lower winding of relay 910 is of comparatively low impedance and as the tube is now omitted from the circuit through 940 and 950, their operation is ensured now, due to the comparatively low resistance path completed therefor. The tube 970 is extinguished. At contacts 912, relay 910 closes both sides of the line together to improve the transmission and application of the high voltage to relay 940 and magnet 950, as the impedance of the circuit is lowered. This relay and magnet perform the same functions at Paystation 900 as relay 240 and magnet 250 respectively at Paystation 200. When the high voltage potential is removed relays 910 and 940 and magnet 950 restore. The lower winding of relay 910 is arranged to restore contacts 911 in this circuit even if the normal 48 volt exchange battery should be provided to the circuit before relay 910 has completely restored. When relay 910 is restored the shunt around tube 970 and its own upper winding is opened while contacts 912 also open.

Relay 520 also closes contacts 525 to complete a circuit to slow-to-operate relay 560, which operates to open contacts 562 and release relay 550. Its own holding circuit is completed from contacts 652, 583, and 561. Relay 550 releases after a period of time to in turn release relay 540. As each is slow-to-release, the potential supplied by relays 530 and 520 is maintained on the line for a sufficient period of time to insure that the refund relay at the calling station is operated. After relay 540 restores contacts 541 open to restore relay 530, and it in turn restores relay 520 at contacts 532. Relay 520, on restoring, restores the original loop circuit to relay 660 and at contacts 625 opens the operating circuit for relay 560. Relay 560 remains operated over its previously described holding circuit, however.

The operator, noticing that her calling signal lamp is lighted, inserts her plug into jack J5 thereby closing contacts J6 to prepare a holding ground for relay 610. Ground is forwarded over the R lead in any well-known manner from the operator's cord circuit through the lower secondary winding of coil 670 and contacts 613 to operate relay 610. Relay 610 opens contacts 613 and closes 612 to complete its own holding circuit from ground at contacts J6. At contacts 611 it connects the T and R conductors through the secondary of coil 670 to prepare a talking circuit to the calling party. At contacts 614 it opens the operating circuit for relay 650, which starts to restore. At contacts 615 it completes an operating circuit to relay 620. Relay 620 opens contacts 623 to remove the shunt around relay 630, and it operates in the loop circuit to relay 660, before relay 650 recloses the other shunt at contacts 654. Relay 630 closes contacts 631 to connect the upper winding of relay 640 across a primary of coil 670. Contacts 621 open to disconnect the ring back tone. Closing contacts 631 enables the paystation identification tone, forwarded to the lower winding of impedance 640 on a call from a paystation and induced across its secondary, which is now connected across the primary of coil 670 through condenser C621, to be heard by the operator, as she is connected across the secondary of coil 670. At contacts 624 relay 620 completes its own holding circuit from contacts 663, while at contacts 625 it opens the circuit to the calling signal lamp 675, which extinguishes. At contacts 626 it connects another holding ground for the lower winding of relay 580 and for relay 560 if they are operated. At contacts 628 it opens the original point for supplying battery to the selector switch. At contacts 627 it provides an alternate path to ground the C1 and C2 leads from the lower winding of impedance 440. Relay 650 is restored to open contacts 653, however ground is already connected to the C1 conductor over contacts 627 as just mentioned to hold the preceding switch. Relay 650 restoring completes the shunt for relay 630 at contacts 654. Relay 630 restores to disconnect the upper winding of 640 from across coil 670 and the operator may now converse with the calling party over the completed talking circuit. In the meantime relay 570 operates over contacts 622 and 581, if relay 580 has been operated. It opens contacts 571 and 573 and closes contacts 572 and 574 thus reversing battery on the loop to the calling party. Rectifier 235, therefore, no longer shunts collect relay 230 at a calling prepay postpay paystation. Relay 230 operates to close contacts 231 for shunting itself and throws the paystation into the postpay condition. If the call is from station 900, collect relay 930 is operated instead and for the same purpose. If the call is from station 900A, it will be remembered that relay 580 is not operated and therefore relay 570 remains unoperated and no reversal of battery occurs.

The operator identifies a calling paystation by the tone, and requests the proper coin deposit before completing the connection. The deposit falls directly into the coin hopper without the necessity of a collect attempt, as the paystation is in the postpay condition and the operator may now complete the connection. In the event the call is from a regular subscriber she merely tickets the call and proceeds to extend it in any well-known manner.

*Reverting call switch 700*

If the subscriber at a party line is calling another station on his line, he dials the proper digit in this case 1 on the selector switch, after having first made his deposit in the case of a paystation all in a manner previously described. For the purpose of testing the ringer at a single station line, a connection is extended therefor in a similar manner, but only at a paystation is a deposit made. The selector switch on a call from a paystation initially tests for battery over lead C3, contacts 811 and 851. On finding the same the loop is extended over the −L3 and +L3 conductors, contacts 711 and 751 to battery through the upper winding of relay 770, and through the upper winding of relay 760, contacts 713 and 751 to ground through the lower winding of relay 770 respectively. Relay 760 energizes to close its X contacts only at this time. A call from station 900A is extended through link 300A' and over the −L4 and +L4 conductors to relay 770, after testing for battery over lead C4. Relay 760 is thus omitted for the loop and does not operate. Relay 770 operates in any case to close contacts 771 and operate slow-to-release relay 810. Relay 810 opens contacts 811 to remove battery from the C3 and C4 conductors and closes contacts 812 to return ground over either the C3 and C4 conductors for holding the preceding switch in a manner already explained. Contacts 813 close to prepare a circuit to the upper winding of relay 870 and the upper winding of relay 860. Contacts 814 close to prepare an impulsing circuit for the stepping magnet of the minor switch MS 880.

The calling subscriber now dials the last digit of the called party's number in the case of a reverting call or in the case of a ringer test, he dials a number specific thereto. Relay 770 is pulsed accordingly. Relay 770 pulses contacts 772 to energize the stepping magnet of MS 880, a number of times corresponding to the dialled digit, over contacts 814 and 832. Relay 820 is energized over the same contacts, and as relays 810 and 820 are both slow-to-release, they remain operated during the time that contacts 772 are pulsed by relay 770. Relay 820 opens contacts 821 to prevent the completion of a circuit to relay 830. The minor switch MS 880 is stepped in accordance with the digit dialled, which in the case of a party line call is 1–4 and in the case of a ringer test on an individual line is 5 to select a harmonic ringing frequency corresponding to the desired party's ringer.

Contacts 816 closed by relay 810 prepared a circuit to relay 740, and completed a circuit to the lower winding of relay 760 over its X contacts when relay 810 was initially operated. It will be recalled that the upper winding of relay 760 was energized on a call from a paystation. Relay 760, whose lower winding was energized, when relay 810 closed contacts 816, operates its contacts, before the last digit was dialled to step MS 880. At contacts 761 its upper winding was shunted from the loop to relay 770 to improve the pulsing of relay 770. At contacts 762 a circuit was prepared to relay 730, and at contacts 763 a point opened an incomplete circuit to relay 750.

At the end of the digit relay 820 is restored as the circuit to both it and the stepping magnet is opened at contacts 772. When the minor switch takes its first step, off-normal springs O.N. 1 are closed to energize relay 850. It opens contacts 851 to open another point in the circuit for supplying battery to the C3 and C4 conductors; prepares an incomplete circuit to the minor switch release magnet at contacts 852 and at contacts 853 prepares a circuit to relay 830. This circuit is completed over contacts 821 on release of relay 820 at the end of the dialled digit. Relay 830 operates to close contacts 831 to prepare a circuit to relay 730; opens contacts 832 to open another point in the circuit to relay 820 and at contacts 833 it completes its own holding circuit from ground over contacts 853. By opening contacts 832 it also prevents any further pulses from being transmitted to the minor switch in the event the dial is inadvertently operated again.

The calling party now replaces his handset to open the loop to relay 770 which restores to close contacts 772. Contacts 771 open to release relay 810, but it is slow-to-release. A previously prepared circuit is therefore completed to relay 730 if the call is from a paystation over contacts 772, 814, 831, 842, 762 and 742. Slow-to-release relay 730 operates before relay 810 restores and completes a circuit for energizing slow-to-release relay 720 at contacts 731.

Relay 720 closes contacts 721 to prepare a circuit for returning +110 volt unlocking and refund potential. At contacts 722 it completes a circuit to slow-to-operate relay 710. Relay 710 operates to open the incomplete loop to relay 770 at contacts 711 and 713, and closes contacts 712 and 714 so that the +110 volt unlocking and refund potential is sent back to the party line to operate a relay corresponding to B at the party line stations in a manner similar to the operation of the A relay at those stations on the application of −110 volt potential thereto. It in turn operates contacts B1 and B2 to energize relay 260 and the refund relay 240 together with magnet 250 respectively. The lock-out relay at every station is operated over contacts 261 and 262. The lock-out relays at the locked out stations reconnect the −L and +L conductors to their respective station circuits. At the calling station the operation of the refund relay refunds the initial deposit; resets the coin springs and retains the paystation in the prepay position. If the call is from Paystation 900 the refund relay 940 is operated thereat to refund the deposit all in a manner described on the application of −110 volt potential thereto from the CLR trunk. At contacts 715 a circuit is completed for holding relay 810 operated, before it restores. At contacts 716 a circuit is completed from ground at contacts 816 to slow-to-operate relay 740. Relay 740 operates to open the circuit to relay 730 at contacts 741. Relay 730 starts to restore to open the circuit to relay 720. Relay 720 in turn restores to remove the +110 volt potential from the line at contacts 721 and opens the circuit to relay 710 at contacts 722. It restores. The period required for these operations is long enough to ensure that the refund operation and the operation of the lock-out relays at the party line stations respectively are completed. Relay 740 on operating also closes contacts 741 to complete a circuit for relay 750 over contacts 772, 814, 831, 842, 762, and 741. Relay 740 also completes its own holding circuit at contacts 743, while relay 750 closes contacts 752 and 754 to prepare an operating circuit for relay 840 through which ringing current is forwarded and closes contacts 755 to provide an operating circuit for relay 810, before relay 710 restores.

On a non paystation call relay 750 is operated directly on relay 770 restoring over a circuit including contacts 772, 814, 831, 842 and 763. It closes contacts 755 to hold relay 810 and closes contacts 752 and 754 to forward ringing current.

The frequency selected by the minor switch MS 880 with battery superimposed thereon is now sent through the lower winding of slow-to-operate and slow-to-release relay 840 and over contacts 754 closed by relay 750, and the line loop to signal the called party. It will be noted that the ringing current with battery superimposed thereon is sent over the positive side of the line and returned to ground at contacts 752 over the negative side of the line to ensure that the lock-out control relays remain unoperated.

The called party, on being signalled by his operated ringer, answers to complete the D.C. loop from ground at contacts 752, the loop to the called station and back over the contacts 754 through the lower winding of relay 840 to battery superimposed on the selected ringing conductor. Relay 840 operates to close its X contacts, which fully energize its upper winding from ground at contacts 813. It now operates its remaining contacts to open the circuit to relay 750 at contacts 842. At contacts 841 a tone signal is returned to the party on the line from condenser C890 and contacts 871. This informs the called party that the call is a reverting call and that he should wait for the calling party to come on the line. If the calling party completed the loop to relay 840, the tone informs him that the called party has not answered.

The D.C. loop is completed when one of the parties comes on the line, and this operates the collect relay at that party's station as battery is connected to the +L lead and ground to the −L lead. The same operation occurs at a station such as 900 when the handset thereat is lifted in response to the ringer test. The operation of the collect relay throws the paystation into the collect position.

Relay 750 restores to recomplete the loop to relay 770 at contacts 751 and 753 and to open contacts 752 and 753 to restore the lower winding of relay 840 only. This also cuts off the ringing current from the line loop. Relay 770 operates and completes the original operating circuit for relay 810.

In the meantime a pulse over lead R1 from a common pulser in the central office equipment, which is supplying continuous pulses in any well-known manner to leads R1 and R2, is forwarded over contacts 843 and 873 to the lower winding of relay 860. It operates to close contacts 861 and 862. Closing contacts 861 energizes the upper winding of relay 860 over contacts 813 and 872. At contacts 862 a pulse from the common pulser is forwarded from lead R2 to the lower winding of relay 870. That winding energizes to close the X contacts and complete a circuit for the upper winding of relay 870 from ground at contacts 813. Relay 870 now operates all of its contacts to cut off the tone signal at contacts 871; deenergizes the upper winding of relay 860 at contacts 872, and opens the circuit to the lower winding of relay 860 at contacts 873. The other party coming on the line as a result of the reverting call is now able to converse with the first party on the line, battery being supplied therefor from relay 770. It will be remembered that if both parties come on the line while battery was applied to the +L conductor both stations are thrown into the postpay position, but if as is usually the case, relay 770 is connected to the line by the time the second party comes on the line, his collect relay remains unoperated.

*Release*

In the event a called subscriber fails to answer on a local call, the calling subscriber replaces his hand-set to open the loop circuit to relay 420, which restores to open contacts 421 and release slow-to-release relay 430. Relay 430 restores to open the circuit to the lower winding of relay 420′ at contacts 435. The circuit to the upper winding of relay 420′ is opened at contacts 431, and relay 420′ restores. A circuit is now completed from contacts 422, 434 and 429′ through springs V.O.N. 10 to operate the release magnet so that the Connector Switch 400 starts to restore. Relay 420 on restoring also removes ground from the C′ wiper at contacts 424 to restore the line cut off relay at the called subscriber's line. At contacts 421′ and 422″ it opens a point in the circuit for applying ringing current to the called line. At contacts 423″ the ring back tone is cut off while at contacts 425′ it opens the circuit for intermittently operating relay 480 so that it is restored. At contacts 427′ it opens the circuit to relay 460, if it is operated, and relay 460 opens the circuit to relay 450 to restore it.

If the called line was busy, relay 480 is continuously operated instead of relay 420′. Relay 420 is restored on release as above, to restore relay 430. The holding ground for relay 480 at contacts 431 is removed and relay 480 restores. The connector switch release magnet is operated as above and the connector switch restores.

Ground is removed from the C wiper when relay 430 opened contacts 432 so that relay 380 in the selector switch 300 is restored. A similar release operation occurs at the respective selector switches in links 300A and 300A′ respectively on calls extended therethrough and those links are restored in any well-known manner. When relay 380 restores it closes contacts 387 to complete a circuit over contacts 392, 328′ and springs V.O.N. 4 to operate the release magnet so that the selector starts to restore. At contacts 389 it restores slow-to-release relay 360, and at contacts 389′ is completes the circuit to slow-to-release relay 350, before slow-to-release relay 360 restores, over contacts 329′, 389′ and 362. Relay 350 closes contacts 351 to prepare a circuit for returning +110 volt unlocking potential to the calling line, and at contacts 352 completes a circuit to slow-to-operate relay 340.

Relay 340 operates to maintain the CN conductor grounded at contacts 346, and at contacts 342 and 344 returns the +110 volt unlocking potential to the party line. The unlocking potential is returned to all relays corresponding to A and B and neon tube 270. Only the B relay at each station operates from the +110 volt potential and it closes contacts B1 and B2. Contacts such as B2 at each station complete an obvious circuit for operating the refund relay such as 240 and the coin spring magnet such at 250 at each station. The calling station is therefore returned to the prepay position. Contacts B1 at each station close to complete a circuit to a relay such as 260. Each relay such as 260 in turn completes a circuit for operating the lock-out relay at each station in a direction opposite to that in which it was operated when locked. This connects all the locked out stations to the line.

Slow-to-operate relay 350 restores some time after relay 360 opens contacts 362. It thus opens contacts 352 to restore relay 340 so that all relays in the switch are now restored.

The calling subscriber may have released the connection at any time before the selector extended the connection. This might occur if the selector in searching for an idle connector or trunk circuit was stepped to the last position of a particular level. Springs R.O.N. 7 close and springs R.O.N. 6 then open. Busy tone is then returned over the described circuit for returning dial tone with the above noted exception, and the calling party hangs up. The selector release operation is only slightly different as relay 380 is not operated. Relays 315 and 320′ are operated. On release of the connection relay 390 is released to restore relays 315 and 320′ respectively. Relay 350 is operated as previously described, and before relay 360 restores under control of contacts 326′. The release operation then proceeds as previously described.

Release of link 300A removes ground from lead C7 in any well-known manner to restore relay 1040. A circuit is then completed for slow-to-release relay 1020 over contacts 1044 and 1031. Relay 1020 operates slow-to-operate relay 1010 at contacts 1022. From contacts 1021, −110 volt refund potential is returned over contacts 1012 and 1014 to the −L′ and +L′ conductors respectively. This is returned to the calling paystation refund magnet 940 and to magnet 950. They operate as previously described and the paystation is returned to the prepay position. In the meantime contacts 1043 being open relay 1030 starts to restore and finally opens contacts 1031. Relay 1020 restores thereafter to restore relay 1010.

Link 300A' on restoring restores the line circuit 100 of the calling station 900A in any well-known manner.

In the event that the connection is completed, both parties must restore their handsets before the connector switch releases. That is because relay 410 holds the lower winding of relay 420' energized at contacts 415 and relay 430 (held operated by relay 420) also holds the lower winding of relay 420' energized at contacts 435. When both parties have released, relay 420' is deenergized by restored relays 410 and 430 to open the circuits to the upper winding of relay 470 and its own upper winding respectively at contacts 424'. The previously described release operation now takes place at the calling end of the connection. If the call is to station 900A, the release operation there takes place in any well-known manner. At a called station such as 200 or 900 the station has been thrown into the postpay position on answer and the refund relay thereat must be operated to return the paystation to the prepay position. In the case of a call to Paystation 200, restoration of relay 380 by the removal of ground on the C' wiper restores relay 380 to close contacts 389'. A circuit is now completed to relay 350 before relay 360 restores. Relay 340 is operated at contacts 352 and +110 volt refund potential is returned to the called station to operate the relay corresponding to B at all the stations on the line. The refund magnet at each station is operated and the called station is returned to the prepay position and the other stations are reconnected to the line all in a manner previously described. In the case of a call to station 900 the removal of ground from the C' wiper restores relay 1040, and the aforedescribed procedure takes place for returning refund potential to station 900 is completed as described on release of an outgoing call therefrom. The station 900 is therefore returned to the prepay position.

On release of the call to a toll operator, the calling party replaces his handset to open the loop tor relay 660. Relay 660 now closes contacts 662 to light a cord circuit lamp (not shown) over the sleeve lead to signal the operator that the calling party has hung up. She now removes her plug from jack J5 to restore relay 610. Relay 610 restores to open contacts 615, and as the contacts 663 are open relay 620 restores. Restoration of relay 620 opens contacts 622 to restore relay 570, which restores the original connection from the selector bank contacts to relay 660 at contacts 571 and 573. At contacts 626 the circuit to relay 560 is opened and at contacts 628 battery is restored to the C1 and C2 conductors, while ground is removed therefrom at contacts 627. Relay 580, if it is operated, is restored simultaneously with relay 560 as the circuits to both are open at contacts 626 and 652. Ground being removed from the C1 conductor causes relay 380 in the selector switch to restore and complete the described sequence of release operations. The removal of ground also causes the release of the link 300A or 300A' respectively if either of these seized the trunk circuit and the aforedescribed respective release procedure is completed.

In the event that the operator did not want to release the connection and desires to re-ring the calling party as on a delayed toll call, she leaves her plug in jack J5 to hold relay 610 operated thus maintaining the preceding switch in its operated position. She inserts ringing cord P7 in jack J8 and then closes one of the non-locking keys associated with cord P7 and corresponding to the calling party's ringing frequency (F1—F5) to forward ground to relay 510. Relay 510 operates to close contacts 512 and 514 so that the particular ringing frequency is transmitted from the cord P7 through the particular operated key and back over the line to operate the calling party's ringer to signal him. After the calling party comes back on the line to reoperate relay 660, she may request a further deposit if it is necessary. The deposit is collected without the necessity of a collect operation by the operator as the paystation is in the postpay position.

On a call utilizing the reverting call switch both parties must replace their handset in order to restore the relay 770. Of course if only one party is on the line, relay 770 restores when he hangs up. Relay 810 restores at contacts 771. When relay 770 restores, it also closes contacts 772 to complete the circuit to the minor switch release magnet over contacts 815 and 852 to restore the minor switch MS 880 to normal. Contacts 813 open when relay 810 releases to restore relay 840. At contacts 816 relay 760 and 740 are restored if operated. At contacts 812 ground is removed from the C3 and C4 leads so that the preceding selector switch is restored to initiate the respective aforedescribed release operations. The +110 volt potential returned therefrom causes any paystation in the postpay position to be returned to the prepay position as explained.

The particular embodiment of the invention disclosed herein being only one form thereof I am appending hereto a series of claims which I believe encompasses the scope of the invention.

What is claimed is:

1. A prepay postpay paystation at which a coin must be deposited before a call can be initiated over a line extending to a central office, comprising a relay at said paystation operated on a certain type of call for placing said paystation in a postpay position and for collecting a coin on deposit, a refund relay connected to said line and operated on any type of call from said station for either refunding a coin on deposit or for placing said paystation in a prepay position, and a gas discharge tube connected to said refund relay and through which a circuit is completed from said line for operating said refund relay only when a predetermined potential is applied thereto.

2. For use in a telephone system, a plurality of prepay postpay paystations on a party line, a coin control relay individual to each paystation, a lock-out arrangement for each of said paystations, and means operated on initiation of a call for operating the coin relay at one of said stations and the lock-out arrangement at another one of said stations to place said other station in the locked-out condition on a call from said one station, means for extending a call from said one station to an operator's position, means effective on the extension of said call to said position for operating said coin relay at said one station to refund a deposited coin thereat, another coin relay at said one station, means for operating said other coin relay on extension of a call to said operator's position to place said station in the postpay position, a last prepay postpay paystation with a line individual thereto, said means for extending a connection to an operator's position including a combined line recording trunk available to said last paystation for extending a connection to said operator's position, a coin relay at said last paystation, said means for operating said other coin relay also operated on a call to said position from said last paystation for operating the coin relay thereat to place said last paystation in the postpay position, a refund relay at said last paystation for placing said last paystation in a prepay position, and a gas discharge tube connected to said refund relay and through which a circuit is completed from said individual line on termination of a call to said operator's position for operating said refund relay only when a predetermined potential is applied thereto.

3. For use in a telephone system, a plurality of prepay postpay paystations on a party line, a coin control relay individual to each paystation, a lock-out arrangement for each of said paystations, means operated on initiation of a call for operating the coil relay at one of said stations and the lock-out arrangement at another one of said stations to place said other station in the locked-out condition on a call from said one station, means for extending a call from said one station to an operator's position, means effective on the extension of said call to said position for operating said coin relay at said one station to refund a deposited coin thereat, another coin relay at said one station, and means for operating said other coin relay on extension of a call to said operator's position to place said station in the postpay position, a last prepay postpay paystation with a line individual thereto, said means for extending a connection to an operator's position including a CLR trunk available to said last paystation for extending a connection to said operator's position, and a coin relay at said last paystation, said means for operating said other coin relay also operated on a call to said position from said last paystation for operating the coin relay thereat to place said last paystation in the postpay position.

4. In a telephone system, a party line, a plurality of prepay postpay paystations on said party line each normally in the prepay position, a coin control relay individual to each paystation, a lock-out arrangement for each of said paystations, means operated on initiation of a call for operating the coin control relay at one of said stations and the lock-out arrangement at another one of said stations to place said other station in the locked-out condition on a call from one said station, an operator's position, means for extending a call from said one station to said operator's position, means effective on the extension of said call to said operator's position for operating said coin relay at said one station to refund a deposited coin thereat, another coin control relay at said one station, and means for operating said other coin control relay on said extension of said call to said operator's position to place said one station in the postpay position.

5. In a telephone system, a plurality of lines, one of said lines being a party line, a plurality of prepay postpay paystations on said party line each normally in the prepay position, another one of said lines being an individual line, a prepay postpay paystation on said individual line normally in said prepay position, a lock-out arrangement for each said prepay postpay paystation on said party line operated for locking out all non-calling stations thereon in response to an initiated call from a station thereon, an operator's position, a combined line and recording trunk accessible to any one of said lines for completing a call therefrom to said operator's position, means at said combined line and recording trunk operated on a call thereto from a prepay postpay paystation on said individual line for refunding a coin deposit thereat, said last means effective on a call from a prepay postpay party line paystation for refunding a coin deposited thereat without effecting said locked out stations, means at said combined line and recording trunk accessible to said operator's position for operating said lock-out arrangement for unlocking all stations on said party line in the event said calling station on said party line has released said call and for signalling one station on said party line, and means thereafter effective for placing the one station in a postpay condition when said one station responds to said signal.

References Cited in the file of this patent

UNITED STATES PATENTS

| | | |
|---|---|---|
| Re. 22,820 | Saunders | Dec. 17, 1946 |
| 1,289,854 | Martin | Dec. 31, 1918 |
| 2,217,041 | Boswau | Oct. 8, 1940 |
| 2,226,731 | Lomax | Dec. 31, 1940 |
| 2,245,799 | McClew et al. | June 17, 1941 |
| 2,367,769 | Goddard | Jan. 23, 1945 |
| 2,583,783 | Lomax et al. | Jan. 29, 1952 |
| 2,791,634 | Lomax | May 7, 1957 |
| 2,819,343 | Faulkner | Jan. 7, 1958 |
| 2,883,462 | Dimmer | Apr. 21, 1959 |

FOREIGN PATENTS

| | | |
|---|---|---|
| 206,559 | Switzerland | Nov. 16, 1930 |